UNITED STATES PATENT OFFICE.

IRA ALLEN SHANTON, OF CARSON CITY, MICHIGAN.

MANUFACTURE OF SIRUPS.

SPECIFICATION forming part of Letters Patent No. 534,286, dated February 19, 1895.

Application filed August 17, 1894. Serial No. 520,599. (No specimens.)

*To all whom it may concern:*

Be it known that I, IRA ALLEN SHANTON, a citizen of the United States, residing at Carson City, in the county of Montcalm and State of Michigan, have invented certain new and useful Improvements in the Manufacture of Sirups, of which the following is a specification.

My invention relates to the manufacture of maple sirup and maple sugar, and consists in a novel method or mode of procedure whereby I am enabled to produce the same at all seasons, of superior quality and at small expense.

The essential features of my invention consist in reducing sugar maple wood to small particles, adding thereto a proper quantity of pure water, together with oily matter and alkaline matter in proper proportions, and boiling the mixture in a close vessel until the flavor is thoroughly extracted from the wood.

In practice it is advisable to employ meat, skin, green bone, or equivalent substance, to supply the oily matter and to take up the tannin which is precipitated by the alkaline matter. The method may be varied somewhat in its details without departing from the spirit or scope of my invention, as will be seen from the following statement of two slightly different formulæ:

For convenience it will be assumed that one gallon of maple sirup is to be made. For this purpose take four pounds of maple wood (preferably green) and divide it into fine bits, which may be done after the manner of grinding wood for wood pulp, or in any other convenient way, and add to it from six to eight quarts of water, preferably well water because of its containing more or less alkaline matter. To this add a meat skin weighing one hundred grains, or a piece of meat with the lean predominating and weighing about one hundred grains, or a fresh bone of about the same weight. If meat be used, it should be incased in a cloth to prevent the particles from separating and mingling with the sirup. In practice it is preferred to use the skin or flesh of the hog, or the bone thereof. The mixture thus prepared is boiled for from five to six hours, after which the liquor is strained, and preferably but not necessarily cooled. Even after this operation a portion of the flavoring principle still remains in the wood, and in order to obtain this, the wood may be further boiled or rinsed with water. To the strained liquor is added six pounds of granulated sugar, or its saccharine equivalent (glucose, muscovado, &c.) and after such addition the whole is brought to the boiling point, strained, and then boiled to the desired consistence. When it is desired to produce sugar, the boiling is continued until crystallization takes place.

The entire boiling operation is to be performed in a closed vessel, the cover of which should fit quite closely, and should be provided with an outlet for the escape of the water produced by the condensation of the steam.

It is well known that where sirup is boiled in open vessels the strength of the liquor is reduced and the flavor is impaired through escape into the atmosphere of flavoring properties of the liquid, and it is to prevent this loss that I employ a close vessel. Practical experience demonstrates that a stronger liquor is produced in a close vessel than in an open one.

The object in using the meat skin, meat, or bone in the above recited operation is threefold: First, the oil aids in extracting the flavoring principle from the wood or its sap; second, the skin or the lean meat absorbs the tannic acid, or the lime in the bone precipitates the tannin if the bone be used, and, third, the compound principle in the meat, meat-skin or bone clarifies the liquor and makes it finer in color, purer in quality, and less liable to fermentation than it otherwise would be.

The proportions above given may be varied somewhat according to the character of the wood employed; some woods containing more of the flavoring principle than others, according to the character of the tree itself and to the greenness of the wood.

Having thus described my invention, what I claim is—

The method of manufacturing maple sirup, which consists in reducing sugar maple wood to small particles; adding thereto water, oily matter, and alkaline matter in substantially the proportions stated; boiling the mixture until the sugar is thoroughly extracted from the wood and the tannin precipitated; straining the resulting liquor; adding sugar thereto; and then re-boiling and re-straining.

In witness whereof I hereunto set my hand in the presence of two witnesses.

IRA ALLEN SHANTON.

Witnesses:
WALTER S. DODGE,
HENRY J. GROSS.